June 4, 1957  L. P. EVANS  2,794,771
PRELIMINARY HYDROCARBON CONVERSION OF HEAVY HYDROCARBON
OILS FOR USE IN CATALYTIC CRACKING
Filed July 9, 1953  3 Sheets-Sheet 3

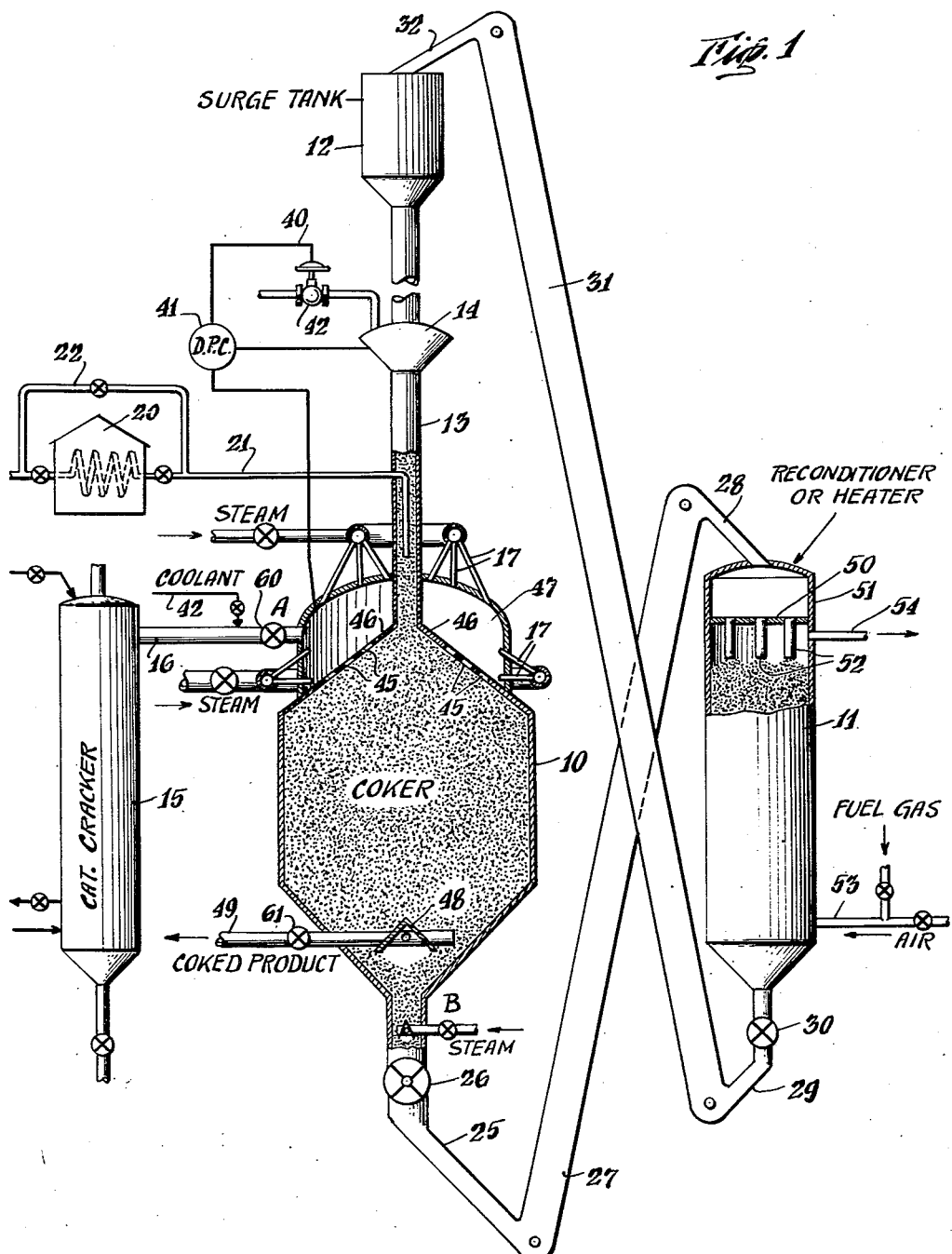

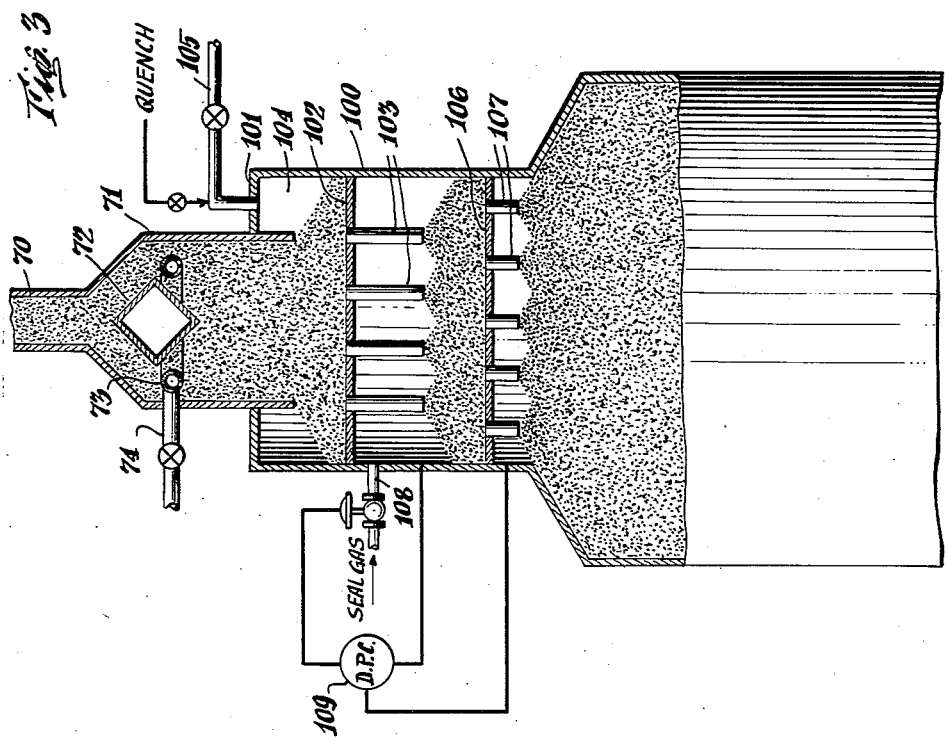
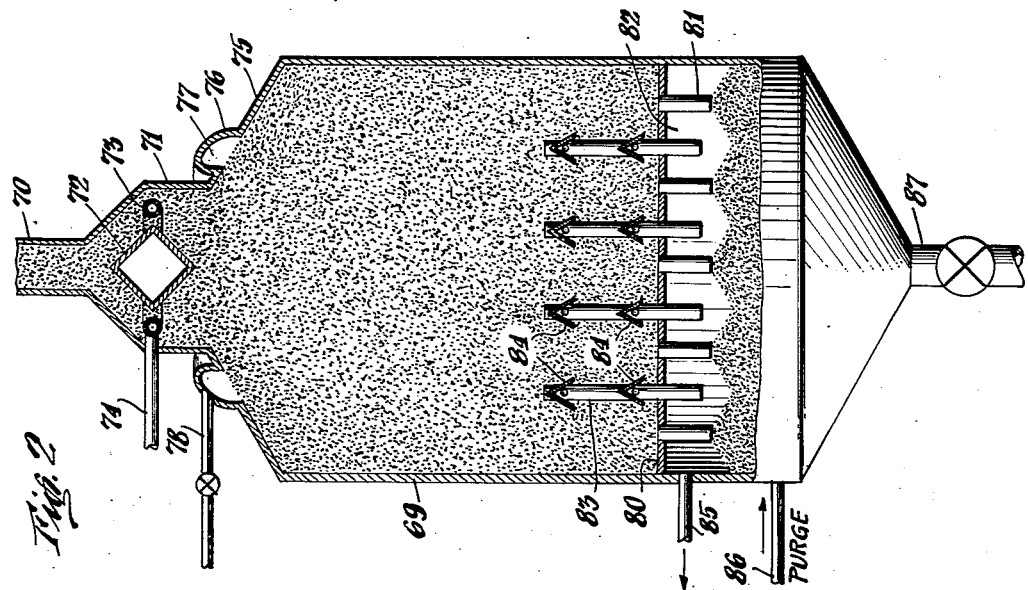

$$SF = \frac{K_T}{K_{800}} \times \frac{CU.\ FT.\ OF\ CRACKING\ VOLUME}{BARRELS\ PER\ DAY\ CHARGE}$$

INVENTOR.
LOUIS P. EVANS
BY
ATTORNEY

United States Patent Office 2,794,771
Patented June 4, 1957

2,794,771

PRELIMINARY HYDROCARBON CONVERSION OF HEAVY HYDROCARBON OILS FOR USE IN CATALYTIC CRACKING

Louis P. Evans, Woodbury, N. J., assignor to Socony Mobil Oil Company, Inc., a corporation of New York Application July 9, 1953, Serial No. 366,967

8 Claims. (Cl. 196—49)

This invention pertains to the conversion of hydrocarbons to lower boiling hydrocarbons. The invention treats specifically the transformation of high boiling hydrocarbons in the presence of a moving mass of particle-form solid contact material.

A large portion of the gasoline used today is prepared from heavier stocks, such as residual crude oils, by contacting the oil with a suitable catalyst at reaction conditions. A preferred process utilizes a reactor and regenerator and suitable connecting mechanism so that a granular contact material is gravitated through the vessels in substantially compact columnar form. The granular material is removed from the bottom of each vessel and transferred to the top of the alternate vessel, thereby completing an enclosed cyclic path. The reactor is maintained at a temperature of about 800–1000° F. and the regenerator is maintained at about 1000–1300° F. The catalyst may be a natural or treated clay, such as bauxite, or a synthetic gel of alumina, silica or the like. The heavy hydrocarbons are usually heated to about 700–800° F. and passed through the void spaces in the reaction bed of the reactor. During conversion a carbonaceous contaminant is formed on the surface of the catalyst, interfering with the catalytic action of the material and hence this coke, as it is referred to, must be periodically removed. Air is blown through the bed of solids in the regeneration zone to burn the coke and place the catalyst in form for reuse. It is understood that these catalytic materials have a contacting surface much larger than the surface of a sphere of equivalent diameter, and it is this contacting surface which is referred to in the above discussion.

Recently heavy residuals, tarry materials and so-called dirty gas oils have been charged to the catalytic cracker in increasing amount because of shortage of the cleaner stocks and the need for increased catalytically cracked materials. These stocks produce larger amounts of coke which contaminates the catalyst at a more rapid pace. Some coke also forms on the metal walls of the "cracker" and its internals and is objectionable in many ways. It, therefore, has become desirable to use a pretreatment step such as a visbreaking, or coking step, prior to the cracking step. The hydrocarbons, at least partially in liquid form, are charged to a bed of hot particles which are largely or completely inert. The hydrocarbons are vaporized in contact with the inerts and thermally converted to lighter products more suitable for use in the catalytic cracking step. The conditions are more severe when coking as compared to visbreaking, so that more gas is produced and more coke is formed. In coking the liquid is reduced to dryness. The inert particles used may be lumps of refractory brick, particles of metal or glass, carborundum or coke. The size range may be about $\frac{1}{16}''-1\frac{1}{2}''$ diameter. The particles may be regular or irregular in shape, and preferably of sufficient hardness to resist crushing.

The virgin gas oil vaporized from the residual oil, when cracked in the cracking system, produces gasoline of superior quality. Thermally cracked material is more refractory than virgin oils and produces less desirable products, when cracked in the cracking step. Prior art visbreaking or coking pretreatment operations for catalytic cracking stocks have involved the collection of the thermally cracked stock with vaporized virgin oil in a commingled body and the passage of the mixture to the catalytic cracking step with resultant degradation of the charge stock.

I have discovered a method of and apparatus for treating a heavy oil at least partially in liquid form at the pretreatment conditions of temperature and pressure, with an inert contact material to produce separate streams of vaporized virgin oil for subsequent catalytic cracking and thermally cracked stock. According to my invention a particle-form inert solid is introduced into the upper portion of a contacting vessel as a continuous substantially compact column and withdrawn from the bottom thereof. The liquid charge is introduced into the column of solids just prior to the introduction of the solids into the vessel, at a point where the cross-section of the stream of solids is substantially smaller than the cross-section of the mass of solids in the vessel. A portion of the liquid charge flashes to a vapor in the upper portion of the mass of solids and is rapidly removed from the top of the vessel without any substantial amount of cracking of the vapors. The remainder of the charge remains on the particles in the form of tar and moves downwardly with the solids through the vessel. The bed of solids is made deep enough so that the tarry material is thermally cracked to produce cracked vapors. These vapors are not permitted to rise through the bed but are withdrawn from the bottom of the bed as gas and low grade thermal products. The virgin oil vaporized in the top portion of the vessel is charged directly to a catalytic cracking system for conversion to high grade gasoline.

The object of this invention is to provide an improved pretreatment process and apparatus for use with liquid hydrocarbon feed to provide superior charge stock for catalytic cracking and maximum yield of useful products from the heavy feed stock.

A further object of this invention is to provide an improved combination coking and cracking process which produces gasoline of superior quality.

A further object of this invention is to provide improved apparatus for vaporizing and coking liquid hydrocarbons to produce the maximum amount of useful products.

These and other objects will be made more apparent in the following detailed discussion of the invention which is made by reference to the attached highly diagrammatic sketches.

Figure 1 shows diagrammatically a continuous moving bed coking system with gas connection to a catalytic cracker.

Figure 2 shows in vertical section a coking vessel.

Figure 3 shows in vertical section an upper portion of a coking vessel.

Figure 4:
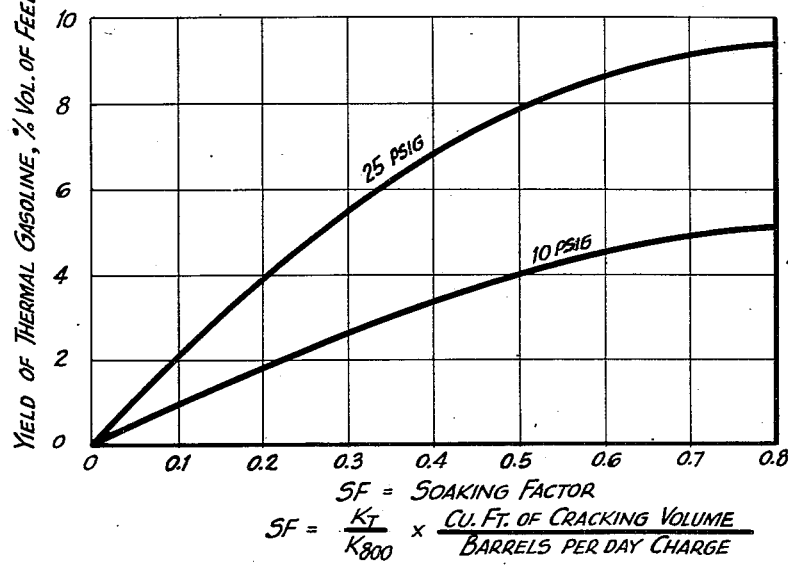
Figure 4 is a graph showing the variation in yield of thermal gasoline with soaking factor.

Referring now to Figure 1, a coker 10, comprising a vertical vessel of enlarged cross-section is shown in side by side relationship with a heater 11. A surge vessel 12 is located above the coker, connected to the top of the heater by the elongated conduit 13. A seal pot 14 is located intermediate the top and bottom of the conduit 13. A catalytic cracker 15 is located alongside the coker 10, being connected to the coker by the conduit 16. Steam lines 17, 17 are shown projected into the top of the coking vessel. A heater 20 is located in the feed line 21 and a by-pass line 22 is located about the heater 20. The feed line 21 is terminated within the conduit 13 at the lower end thereof. A drain conduit 25 is attached to the bottom of the vessel 10 and a flow control valve 26 is located in said conduit. An elevator 27 connects the bottom of the drain conduit 25 with the top of the conduit 28 at the top of the heater 11. A drain conduit 29 is located at the bottom of the heater 10 and a flow control valve 30 is located in said conduit. The elevator 31 communicates the bottom of the drain conduit 29 with the top of the conduit 32 attached to the top of the hopper 12.

In operation, a hot inert particulate material is gravitated in substantially compact columnar form downwardly from the hopper 12 through the seal leg 13, coker 10 and drain conduit 25. The rate of flow of the contact material is controlled by the setting of the valve 26 in the drain conduit 25. An inert gas is introduced into the seal leg 13 through the conduit 40, and seal pot 14. A differential pressure controller 41 is used to control the valve 42 so that the pressure in the seal pot 14 is maintained just slightly higher than the pressure in the coker 10. This prevents the escape of hydrocarbon through the seal leg. A liquid feed is passed through the heater 20 in the line 21 whereby the charge is brought up to temperature. The liquid feed is a heavy stock so that at reaction conditions of temperature and pressure of the coker at least a portion of the hydrocarbons are still in liquid form. A suitable reaction temperature has been found to be about 900–1100° F. The liquid feed stock is introduced into the stream of hot solids in the lower end of the feed leg 13 at about 700–800° F. The contact material is introduced into the coker at or about reaction temperature. A portion of the liquid charge flashes to a vapor on contacting the hot solids and the vapors are removed from the top of the bed of solids in the coker rapidly through apertures 45 in the upper sloping partition 46 of the coker 10. These gases are collected in the manifold 47 and delivered through the conduit 16 to the catalytic cracker 15. The hydrocarbons in contact with the inert contact material require an appreciable period of contact or soaking in order to crack to lighter products. In this invention the vapors formed after short contact with the hot solids are removed from the bed of solids after a short residence time, the residence time being below that required to provide any substantial amount of cracked products. Therefore, substantially virgin oils are delivered to the cracker, which may be of the type used in the T. C. C. process. The virgin oils are immediately passed through a bed of cracking catalyst at reaction conditions and a high yield of superior gasoline obtained. The remaining liquid of the original charge forms a tar on the pebbles or inerts and passes downwardly through the coker 10 with the solids. The coker is made long enough so that the residence time of the liquids in contact with the hot solids is sufficient to coke the liquids to dryness and effect a substantial amount of thermal conversion of the hydrocarbons. The cracked hydrocarbons are withdrawn from the bed of solids in the coker 10 under the channel 48 and removed from the vessel 10 via the conduit 49. The stripping steam is introduced into the conduit 25 near the bottom of the vessel 10 to drive vaporizable products into the vessel 10 and prevent their loss with the inerts.

The inerts, which may be a dry coke, or solids bearing a dry coke, are introduced into the top of the heater 11. A partition 50 may be located across the upper portion of the vessel 11 to provide a surge chamber 51. The solids are transferred through the partition 50 via the drop pipes 52 into the burning portion of the kiln 11. Air is introduced into the kiln 11 through the conduit 53 and blown upwardly through the gravitating bed of solids in the burning section of the kiln. The carbonaceous deposit is burned by contact with the air and the flue gas formed thereby is removed via the conduit 54 in the upper portion of the burning section of the kiln. If coke is used as the inert material, only so much of the coke is burned as is required to bring the temperature up to the desired level and reduce the size of the coke particles to the desired size. The hot solids are lifted through the elevator 31 to the top of the column of gravitating contact material in the surge vessel 12.

The valve 60 in the conduit 16 between the coker and cracker and the valve 61 in the discharge line 49 are adjusted so that the thermally cracked products are substantially all taken downwardly through the bed of hot pebbles instead of passing upwardly with the vapors. Suitable instrumentation may be connected to these valves to automatically provide the removal of the uncracked vapors from the top of the bed. Steam injected into the vapor space 47 at the top of the vessel 10 contacts the hot vapors upon emergence from the bed and rapidly cools the vapor below cracking temperature. Additional cooling liquid may be introduced into the transfer line 16 via the conduit 42. The pressure in the coker may be maintained higher than the pressure in the cracker by the amount necessary to transfer the vapors to the cracker at the desired rate.

Referring now to Figure 2, a portion of a coker 69 is shown in vertical cross-section. A feed conduit 70 of restricted cross-section is attached to the top of the vessel. The feed conduit 70 is terminated in the top of a mixing chamber 71. The mixing chamber 71 has a horizontal cross-section slightly greater than the conduit 70 but substantially smaller than that of the vessel 69. A solids deflecting baffle 72 is centrally located in said chamber. The baffle has a conical upper and lower surface terminating at a point at the top and at the bottom. The side wall of the conical baffle is located at an angle steeper than the angle of repose of the granular contact material, an angle of about 45 degrees being preferred. A ring-type header 73 is located horizontally in the annular space between the baffle 72 and the wall of the chamber 71. The header has orifices distributed about it to provide for introduction of the liquid feed into the chamber 71. The header is connected to the liquid supply pipe 74. The header is located with respect to the conical baffle 72, so that the baffle directs pebbles against the header to keep the feed nozzles on the header scrubbed free of carbon. The roof 75 of the vessel 69 is located at or slightly below the angle of repose of the contact material with the horizontal, so that the column of solids is gradually expanded to the full cross-section of the vessel 69. A collecting manifold 76 is located about the roof 75 and is communicated with the interior of the vessel 75 by the opening 77 in the roof 75. The vapors collected in the manifold 76 are withdrawn via the conduit 78. A partition 80 is located horizontally across the lower portion of the vessel and depending pipes 81, attached to the partition, provide a vapor disengaging space 82 between the pipes for the accumulation of the thermally cracked vapors from the bed of solids. Vertical pipes 83 have cups 84 located at staged elevations. The cups shield an orifice in the pipe 83, so that the vapor can be withdrawn from the bed of solids into the pipes 83 and transferred to the vapor disengaging space 81. Entrained solids are returned to the bed of solids beneath the partition 80 and the vapors are withdrawn from the vessel 69 via the conduit 85. A purge gas is introduced into the vessel 69 via the conduit 86 below the partition 80 to strip the pebbles of vaporizable hydrocarbons. The pebbles are withdrawn from the bottom of the vessel through the conduit 87.

Figure 3 shows an alternate embodiment of the invention. A supply conduit 70 and mixing chamber 71 are shown similar to that described above and similarly numbered. The mixing chamber is projected into the top of a vaporizing chamber 100. The chamber 100 has a flat roof 101. A partition 102 is located horizontally across the vaporizing chamber and drop pipes 103 depend from the partition at location uniformly distributed across the chamber. The liquid feed introduced into the mixing chamber 71 via the conduit 74 and ring header 73 contacts the pebbles flowing laterally over the baffle 72. The vapors formed are withdrawn into the plenum region 104 about the lower end of the chamber 71 and withdrawn from the vaporizing chamber via the conduit 105. The partition 102 and drop pipes 103 inhibit the downward movement of the vapors with the pebbles. A second partition 106 is located horizontally across the vaporizing chamber 100 near the bottom thereof. Drop pipes 107 communicate the vaporizing chamber with the interior of the coker 69. A seal gas is introduced into the region between the partitions 102 and 106 via the conduit 108 at a rate controlled by the controller 109. The controller is adjusted to maintain the pressure in the region between the partitions slightly higher than the pressure in the coker, so as to prevent thermally cracked material from rising into the vaporizing chamber. The vapors removed from the top of the coker are, therefore, uncracked vapors and those removed from the bottom of the coker are thermally cracked vapors. It may be desirable to add a seal gas such as steam, to the coking vessel just below the top of the vessel in the other embodiment shown on Figures 1 and 2 to prevent the thermally cracked vapors from being withdrawn with the uncracked vapors. It is necessary to define the term "uncracked vapors" and this can be done in terms of the allowable cracked gasoline content of the reactor effluent. The cracked gasoline content should not be allowed to exceed an upper limit of 3% volume, based on the charge to the coking process. Of course, it is necessary to withdraw the virgin vapors immediately. This can be accomplished by proper design of the vaporization section of the coking vessel to permit a short contact time between the heat transfer particles and the reduced crude charge.

The design of the vaporization region or zone can be handled by using the soaking factor. The soaking factor is found from the expression:

$$SF = \frac{\text{cu. ft. of contact volume (above 800° F.)}}{\text{B. P. D. charge @ 60° F.}} \times \frac{Kt}{K_{800}}$$

where SF is the soaking factor $\frac{Kt}{K_{800}}$ is the average rate of reaction relative to the rate of reaction at 800° F.

B. P. D. is the barrels per day flow date of the oil charge.

Figure 5:
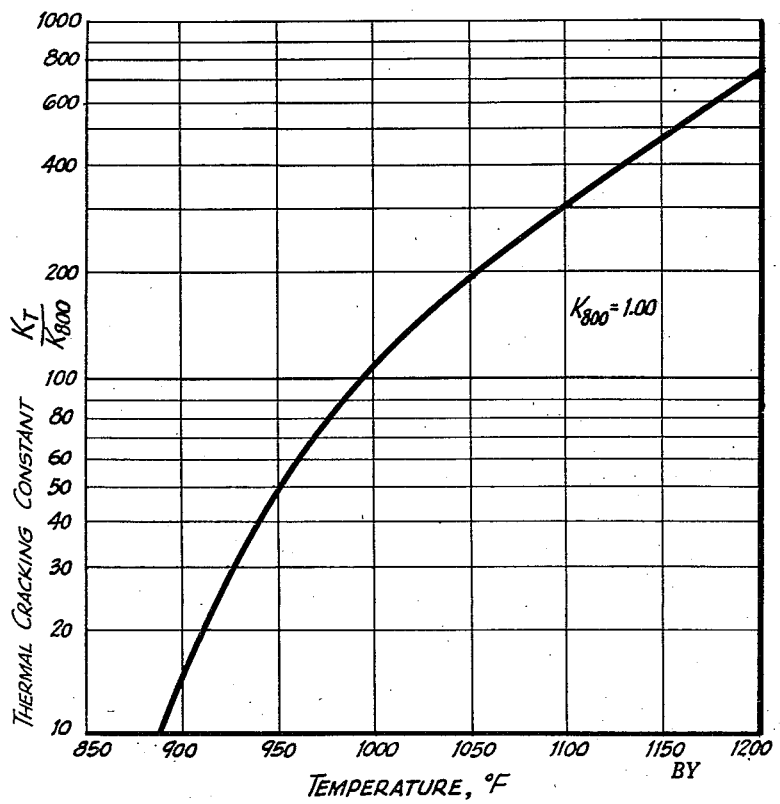
Figure 5 is a graph showing the variation of a constant used in calculating soaking factor with temperature.

Referring to Figure 4, a correlation is shown of soaking factor against yield of thermal gasoline for pressures of 10 and 25 p. s. i. (gauge). The data show that the yield of thermal gasoline decreases with decreasing soaking factor and with decreasing pressure. Referring to Figure 5, a plot of $$\frac{Kt}{K_{800}}$$

(the reactor velocity constant) versus temperature for the decomposition of hydrocarbons and petroleum fractions into gasoline is shown. The general range of soaking factors required in the top of the contact vessel to permit vaporization but to prevent cracking is as follows:

At 10 p. s. i. (gauge) pressure, the soaking factor should be less than 0.35, and preferably less than 0.10. At 25 p. s. i. (gauge) pressure, the soaking factor should be less than 0.16, and preferably less than 0.05.

An illustration of the use of the soaking factor relationship in the design of the vaporization section of the reactor is found in the following example:

*Example I*

Charge to reactor _____ 20,000 bbls./stream day of Scurry County reduced crude (25.8° A. P. I.).
Average temperature __ 1000° F. (In vaporization section).
Pressure _____ 10 p. s. i. (gauge).

From Figures 4 and 5

S. F. = 0.35 for 3% volume thermal gasoline $$\frac{Kt}{K_{800}} = 112$$

Cracking volume = $\frac{0.35}{112} \times 20,000 = 62.5$ ft.³

Assuming that the heat transfer material contains 50% void space between particles, then the volume of the vaporization section is $$\frac{62.5}{0.5} = 125 \text{ ft.}^3$$

*Example II*

Catalyst cracking yields based on processing 20,000 bbls./stream day of Scurry County reduced crude through the coker by the method of this invention, in which the vaporized virgin material is charged to a T. C. C. unit, as compared to the scheme wherein the total products of the coking operation are charged to the T. C. C. unit are shown in the following tabulation:

| Process Scheme | Charging Substantially Uncracked Vapors to T. C. C. | Charging Total Effluent from Coker to T. C. C. |
|---|---|---|
| Yields on Feed to TCC: | | |
| Heavy Fuel Oil, Percent Vol | 19.1 | 15.0 |
| Lt. Fuel Oil, Percent Vol | 26.4 | 25.0 |
| C₄-Free Motor Gasoline, Percent Vol | 38.5 | 40.2 |
| Total Butanes, Percent Vol | 15.3 | 18.4 |
| Dry Gas, Percent Wt | 7.1 | 10.2 |
| Coke, Percent Wt | 4.0 | 4.2 |
| Conversion, Percent Vol | 54.5 | 60.0 |
| Total Liquid Recovery, Percent Vol | 99.3 | 96.6 |
| Octanes of Motor Gasoline: | | |
| Research— | | |
| Clear | 93.5 | 91.6 |
| + ml. TEL/Gal | 99.3 | 97.5 |
| Gasoline/Coke Ratio | 9.6 | 9.6 |

It is seen from the Example II comparison, that the processing scheme of this invention gave a more desirable product distribution with less dry gas and less coke. It is seen also, that the gasoline produced by this scheme is superior in octane quality to that produced from cracking the total coker product.

The examples and illustrations, given hereinabove, were supplied to illustrate the invention, and not to limit its scope. It is intended that the scope of this invention be considered broadly to cover all changes and modifications of the examples of the invention herein chosen for purposes of disclosures, which do not constitute departures from the spirit of the invention.

I claim:
1. The method of treating a heavy hydrocarbon charge with a granular inert contact material which comprises: passing the contact material downwardly as a compact bed through a confined zone, introducing a high boiling liquid hydrocarbon charge into the upper section of the confined zone, the hydrocarbons and solids introduced into the confined zone carrying enough sensible heat to effect the desired vaporization and coking to dryness, whereby a portion of the charge is vaporized without substantial cracking in the upper section of the zone, limiting the soaking factor for the vaporized portion of the charge below 0.35 for a reaction zone pressure of approximately 10 p. s. i. (gauge), withdrawing the vapors, cooling the withdrawn vapors, so as to recover a substantially uncracked vaporizable fraction of the original charge, passing the unvaporized fraction of the charge downwardly with the contact material, to effect coking without further heat addition, withdrawing the coked vapors from the lower section of the confined zone and solids containing dry coke from the bottom of said zone.

2. The method of treating a heavy hydrocarbon charge with a granular inert contact material which comprises:

passing the contact material downwardly as a compact bed through a confined zone, supplying contact material to the top of the bed as at least one gravitating compact stream of restricted cross-section, introducing a high boiling liquid hydrocarbon charge into the stream of solids just prior to the introduction of the solids into the confined zone, gradually expanding the stream of solids in horizontal cross-section under a confining baffle, to effect the gradual enlargement of the stream of solids to cover substantially the entire cross-section of the confined zone, the hydrocarbons and solids introduced into the confined zone carrying enough sensible heat to effect the desired vaporization and coking to dryness, whereby a portion of the charge is vaporized without substantial cracking in the upper section of the zone, limiting the soaking factor for the vaporized portion of the charge below 0.10 for a reaction zone pressure of about 10 p. s. i. (gauge), withdrawing the vaporized hydrocarbons upwardly through the confining baffle near the periphery of the bed of contact material in said confined zone, cooling the withdrawn vapors, so as to recover a substantially uncracked vaporizable fraction of the original charge, passing the unvaporized fraction of the charge downwardly with the contact material, to effect coking without further heat addition, withdrawing the coked vapors from the lower section of the confined zone and granular solids containing dry coke from the bottom of said zone.

3. Apparatus for contacting a liquid hydrocarbon charge with an inert granular contact material comprising: a vertical vessel, a conduit projected downwardly into the top of said vessel, a conical baffle attached to the bottom of conduit, adapted to prevent particle segregation while enlarging the cross-section of a substantially compact stream of solids from that of the conduit to that of the vessel, means for introducing a liquid hydrocarbon charge into said conduit near the lower end thereof, means defining at least one aperture in said confining baffle near the periphery of said vessel, so as to permit vapors to escape upwardly through the baffle, means for spraying cooling fluid into the vessel in the region above the conical baffle, means attached to said vessel for withdrawing the vapors from the region above said conical baffle, means for withdrawing vapors from the lower portion of said vessel and conduit means for withdrawing solid material from the bottom of said vessel.

4. Apparatus for contacting a liquid hydrocarbon charge with an inert granular contact material comprising: an upright contacting vessel, a solids supply pipe of restricted cross-section projected downwardly into the top of the vessel, a liquid feed nozzle in the lower portion of the supply pipe, means for supplying liquid charge to said nozzle, a confining conical baffle at the bottom of said pipe, adapted for gradual enlargement of a granular stream of solids from the side of the supply pipe to the size of the vessel without particle segregation, means defining an aperture in said confining conical baffle, for the escape of a gas from the bed of solids maintained in said vessel through the baffle to the particle-free region above the baffle, spray pipes in said region above said baffle, for introducing cooling fluid into the gas emerging from the region below the conical baffle, means for supplying cooling fluid to said nozzle, and conduit means for withdrawing cooled fluids from the top of said upright vessel.

5. The method of treating a heavy hydrocarbon charge with a granular inert contact material which comprises: passing the contact material downwardly as a compact bed through a confined zone, introducing a high boiling liquid hydrocarbon charge into the upper section of the confined zone, the hydrocarbons and solids introduced into the confined zone carrying enough sensible heat to effect the desired vaporization and coking to dryness, whereby a portion of the charge is vaporized without substantial cracking in the upper section of the zone, limiting the soaking factor for the vaporized portion of the charge below .10, for a reaction zone pressure of about 10 p. s. i. (gauge), withdrawing the vapors, so as to recover a substantially uncracked vaporizable fraction of the original charge, passing the unvaporized fraction of the charge downwardly with the contact material, to effect coking without further heat addition, withdrawing the coked vapors from the lower section of the confined zone and solids containing dry coke from the bottom of said zone.

6. The method of converting heavy hydrocarbons which comprises: passing a granular contact material downwardly through a coking cracking zone, in the form of a gravitating substantially compact bed of solids, introducing a high boiling liquid hydrocarbon feed to the upper section of the coking zone, under conditions to effect partial vaporization of the hydrocarbon charge, withdrawing the major portion of the vaporized charge from the upper section of the coking zone in substantially uncracked condition, passing the vaporized charge directly into a catalytic cracking zone, to effect a substantial conversion of the vapors to light hydrocarbons boiling in the gasoline boiling range, passing the non-vaporized hydrocarbons downwardly with the contact material in said coking zone, to effect the thermal conversion of the hydrocarbons without the addition of heat, all the heat for vaporization and thermal conversion being supplied to the coking zone with the hydrocarbon charge and the granular contact material, passing a minor fraction of the uncracked hydrocarbon vapors released in the upper portion of the coking zone downwardly through the zone with the unvaporized portion of the charge, to prevent vapors of the thermal conversion from being withdrawn from the upper portion of the coking zone, withdrawing the vapor of the thermal conversion from the lower portion of the coking zone and separately withdrawing the granular contact material from the lower end of said coking zone.

7. The method of converting heavy hydrocarbons which comprises: passing a granular contact material downwardly through a coking zone, in the form of a gravitating substantially compact bed of solids, introducing a high boiling liquid hydrocarbon feed to the upper section of the bed of solids, the hydrocarbons and solids introduced into the coking zone carrying enough sensible heat to effect the desired vaporization and coking to dryness, whereby a portion of the charge is vaporized without substantial cracking in the upper section of the zone, limiting the soaking factor for the vaporized portion of the charge below .35 for a reaction pressure of about 10 p. s. i. (gauge), withdrawing the vapors in substantially uncracked condition, cooling the vapors enough to prevent thermal cracking, passing the vaporized charge directly into a catalytic cracking zone, to effect a substantial conversion of the vapors to light hydrocarbons boiling in the gasoline boiling range, passing the non-vaporized hydrocarbons downwardly with the contact material in said coking zone, to effect the thermal conversion of the hydrocarbons without further heat addition, withdrawing the coked vapors from the lower section of the coking zone and solids containing dry coke from the bottom of said zone.

8. The method of converting heavy hydrocarbons which comprises: passing a granular contact material as a compact bed downwardly through a coking zone, supplying contact material to the top of the bed as at least one gravitating compact stream of restricted cross-section, introducing a high boiling liquid hydrocarbon charge into the stream of solids just prior to the introduction of the solids into the coking zone, gradually expanding the stream of solids in horizontal cross-section under a confining baffle, to effect the gradual enlargement of the stream of solids to cover substantially the entire cross-section of the coking zone, the hydrocarbons and solids introduced into the confined zone carrying enough sensible heat to effect the desired vaporization and coking to dryness, whereby a portion of the charge is vaporized without substantial cracking in the upper section of the coking zone, limiting the soaking factor for the vaporized portion of the charge below 0.10 for a reaction pressure of about 10 p. s. i. (gauge), withdrawing the vaporized hydrocarbons upwardly through the confining baffle near the periphery of the bed of contact material in said coking zone, cooling the vapors, so as to recover a substantially uncracked vapor fraction of the original charge, passing the vaporized charge directly into a catalytic cracking zone, to effect a substantial conversion of the vapors to light hydrocarbons boiling in the gasoline boiling range, passing the non-vaporized hydrocarbons downwardly with the contact material in said coking zone, to effect the thermal conversion of the hydrocarbons without further heat addition, withdrawing the coked vapors from the lower section of the coking zone and withdrawing contact material containing dry coke from the bottom of said zone.

References Cited in the file of this patent
UNITED STATES PATENTS

| | | |
|---|---|---|
| 2,239,801 | Voorhees | Apr. 29, 1941 |
| 2,268,535 | Schutte | Dec. 30, 1941 |
| 2,482,137 | Schutte | Sept. 20, 1949 |
| 2,561,420 | Schutte | July 24, 1951 |
| 2,666,734 | Findlay | Jan. 19, 1954 |